(12) United States Patent
Lin

(10) Patent No.: US 6,439,110 B1
(45) Date of Patent: Aug. 27, 2002

(54) FRYING PAN

(76) Inventor: Shao Chiu Lin, PO Box 82-144, Taipei (TW)

( * ) Notice: Subject to any disclaimer, the term of this patent is extended or adjusted under 35 U.S.C. 154(b) by 0 days.

(21) Appl. No.: 10/109,698

(22) Filed: Apr. 1, 2002

(51) Int. Cl.[7] .......................... A47J 37/00; A47J 37/07; A47J 37/10
(52) U.S. Cl. .............................. 99/425; 99/400; 99/408; 99/446; 126/390.1; 210/DIG. 8
(58) Field of Search .................. 99/339, 340, 400, 99/401, 422–425, 403, 408, 444–446, 447, 449, 450; 126/390.1, 385.1, 41 R, 376.1; 210/251, 167, DIG. 8; D7/359, 361, 360

(56) References Cited

U.S. PATENT DOCUMENTS

| | | | | |
|---|---|---|---|---|
| 1,447,813 A | * | 3/1923 | Patrick | 99/425 |
| 1,733,450 A | * | 10/1929 | Detwiler | 99/340 |
| 2,262,302 A | * | 11/1941 | Sinclair | 99/425 |
| 2,534,407 A | * | 12/1950 | Bramberry | 99/390.1 |
| 3,785,274 A | * | 1/1974 | Yamamoto | 99/425 |
| 3,847,068 A | * | 11/1974 | Beer, et al. | 126/390.1 X |
| 4,768,427 A | * | 9/1988 | Cheng | 99/422 |
| 5,313,735 A | * | 5/1994 | Latouche | 99/449 X |
| 5,365,832 A | * | 11/1994 | Gaydoul | 99/422 |
| 5,373,608 A | * | 12/1994 | Welch | 99/403 X |
| 5,673,458 A | * | 10/1997 | Raoult | 99/425 X |
| 5,715,570 A | * | 2/1998 | Hyon | 99/425 X |
| 5,967,024 A | * | 10/1999 | DeMars | 99/400 X |

* cited by examiner

Primary Examiner—Timothy F. Simone
(74) Attorney, Agent, or Firm—Leong C. Lei

(57) ABSTRACT

A frying pan is constructed to include a pan body, the pan body having a flat circular frying wall upwardly protruded from a flat bottom thereof, a step extended around the periphery of the flat circular frying wall, and a plurality of L-shaped hooks equiangularly spaced around the frying wall, and an annular oil filter fitted onto the flat circular frying wall and supported on the step in flush with the flat circular frying wall for filtering excessive edible oil when frying food on the frying wall, the annular oil filter having a plurality of notched bottom mounting lugs respectively coupled to the hooks of the pan body.

1 Claim, 3 Drawing Sheets

FRYING PAN

BACKGROUND OF THE INVENTION

1. Field of the Invention

The present invention relates to a frying pan and, more particularly, to such a frying pan, which is equipped with a detachable oil filter that removes excessive amount of edible oil when frying food.

2. Description of the Related Art

A regular frying pan has a flat bottom, a side extended around the flat bottom, and a handle fixedly fastened to the side. When cooking, edible is poured onto the flat bottom, and then eggs, vegetable, fish, meat, etc. are put in the pan and fried. Because the flat bottom is a flat surface, it is not possible to separate excessive edible oil from fried food when picking up fried food from the flat bottom of the frying pan. It is not good to the health to eat food carrying much edible oil.

SUMMARY OF THE INVENTION

The present invention has been accomplished under the circumstances in view. It is therefore the main object of the present invention to provide a frying pan, which has filter means to remove excessive mount of edible oil from fried food. To achieve this and other objects of the present invention, the frying pan comprises a pan body, the pan body having a flat circular frying wall upwardly protruded from a flat bottom thereof, a step extended around the periphery of the flat circular frying wall, and a plurality of L-shaped hooks equiangularly spaced around the frying wall, and an annular oil filter fitted onto the flat circular frying wall and supported on the step in flush with the flat circular frying wall for filtering excessive edible oil when frying food on the frying wall, the annular oil filter having a plurality of notched bottom mounting lugs respectively coupled to the hooks of the pan body.

DETAILED DESCRIPTION OF THE PREFERRED EMBODIMENT

Figure 1:
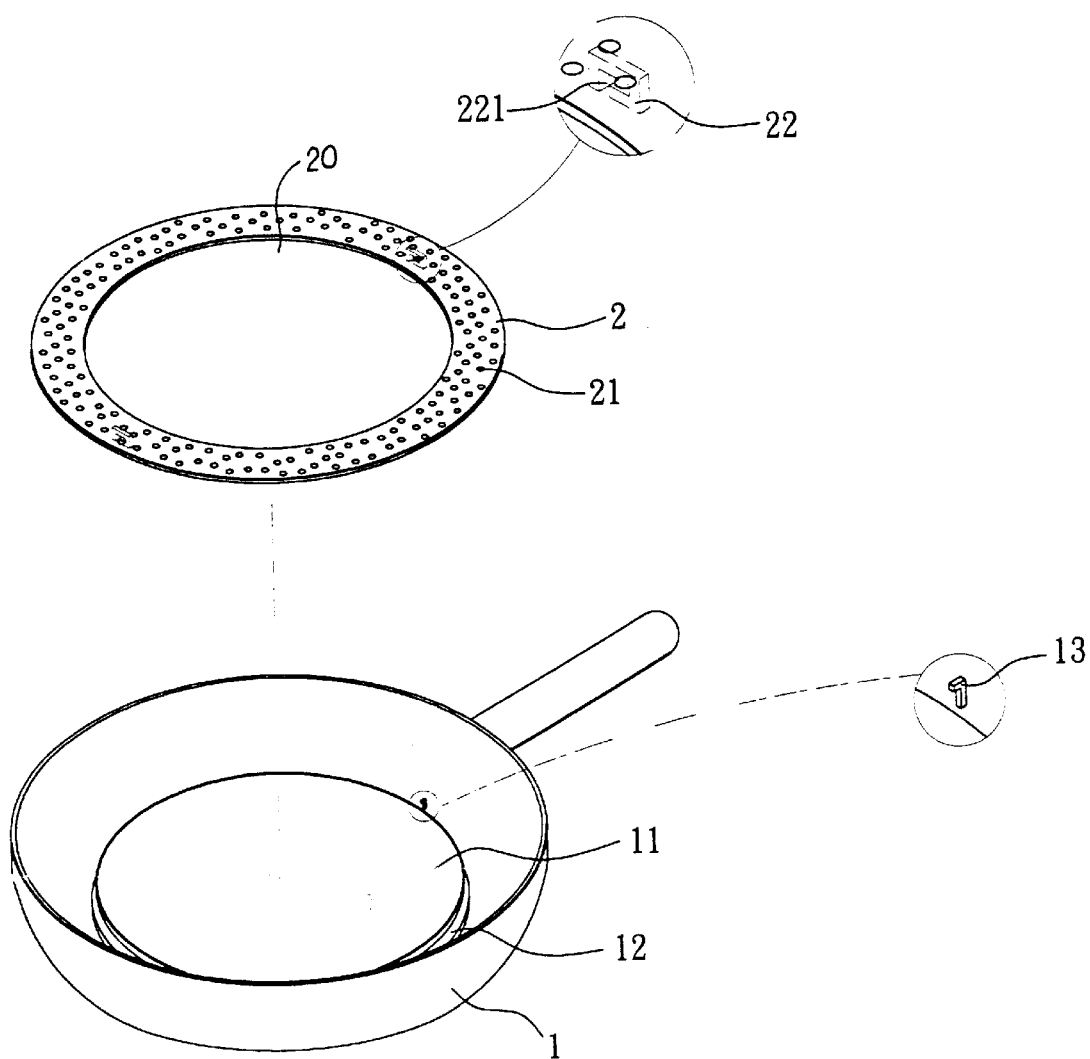
FIG. 1 is an exploded perspective view of a frying pan according to the present invention.
Figure 2:
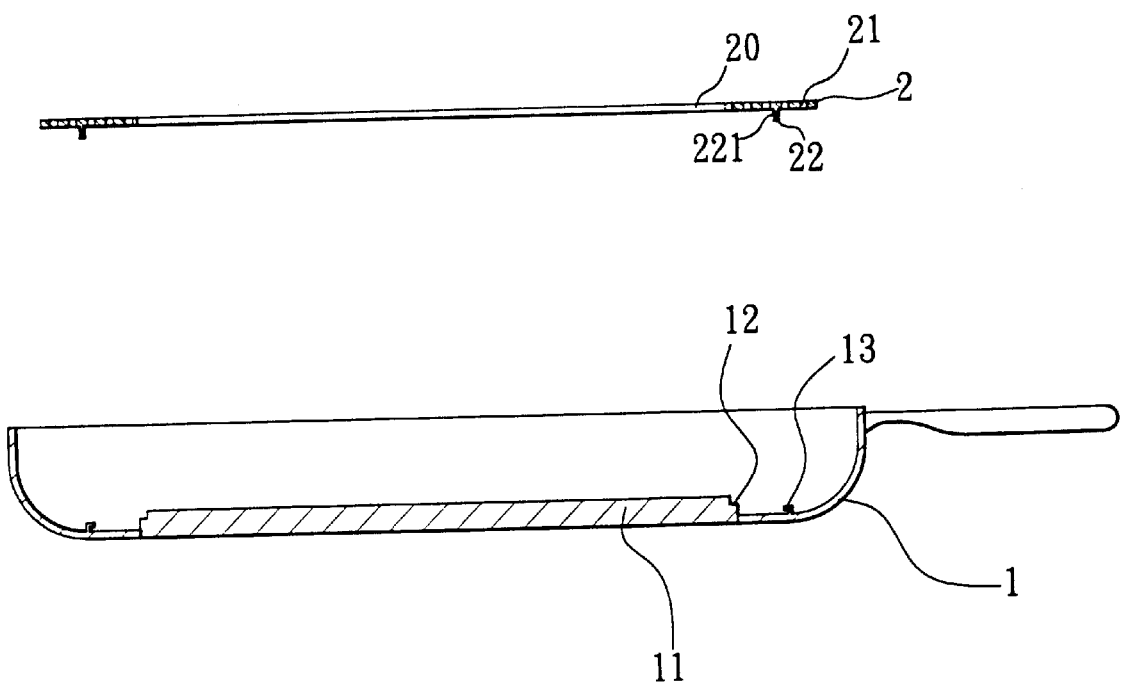
FIG. 2 is an exploded view in section of the frying pan according to the present invention.

Referring to FIGS. 1 and 2, a frying pan is shown comprised of a pan body 1, and an oil filter 2. The pan body 1 comprises a flat circular frying wall 11 upwardly protruded from the bottom thereof, a step 12 extended around the periphery of the flat circular frying wall 11, and a plurality of L-shaped hooks 13 raised from the bottom and equiangularly spaced around the step 12. The oil filter 2 is a perforated annular member fitted onto the flat circular frying wall 11 and supported on the step 12, having a plurality of pores 21 and a plurality of bottom mounting lugs 22 corresponding to the L-shaped hooks 13 of the pan body 1. The bottom mounting lugs 22 each have a L-shaped retaining notch 221. The inner diameter 20 of the oil filter 2 is approximately equal to the diameter of the flat circular frying wall 11 but smaller than the step 12.

Figure 3:
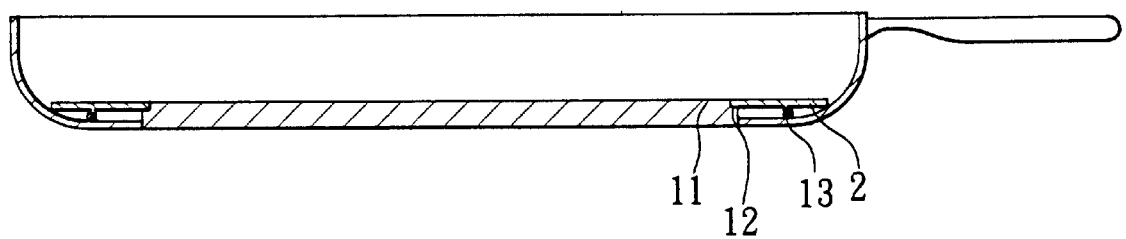
FIG. 3 is a sectional assembly view of the frying pan according to the present invention.

Referring to FIG. 3 and FIGS. 1 and 2 again, the oil filter 2 is fitted onto the flat circular frying wall 11 to force the vertical sections of the L-shaped retaining notches 221 of the bottom mounting lugs 22 into engagement with the L-shaped hooks 13, and then the oil filter 2 is turned horizontally on the step 12 to force the horizontal sections of the L-shaped retaining notches 221 of the bottom mounting lugs 22 into engagement with the L-shaped hooks 13, keeping the oil filter 2 positively secured to the pan body 1. When installed, the oil filter 2 is maintained in flush with the flat circular frying wall 11. When frying food on the flat circular frying wall 1 with edible oil, excessive edible oil flows through the pores 21 to the bottom of the pan body 1 below the oil filter 2 around the step 12. Therefore, picking up fried food from the pan body 1 does not carry much edible oil with fried food.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A frying pan comprising:

a pan body, said pan body comprising a flat bottom, a flat circular frying wall upwardly protruded from said flat bottom, a step extended around the periphery of said flat circular frying wall, and a plurality of L-shaped hooks equiangularly spaced around said step; and an annular oil filter fitted onto said flat circular frying wall and supported on said step in flush with said flat circular frying wall, said annular oil filter having a plurality of pores, and a plurality of bottom mounting lugs respectively coupled to said hooks of said pan body, said bottom mounting lugs each having a L-shaped retaining notch for engagement with said L-shaped hooks.

* * * * *